UNITED STATES PATENT OFFICE.

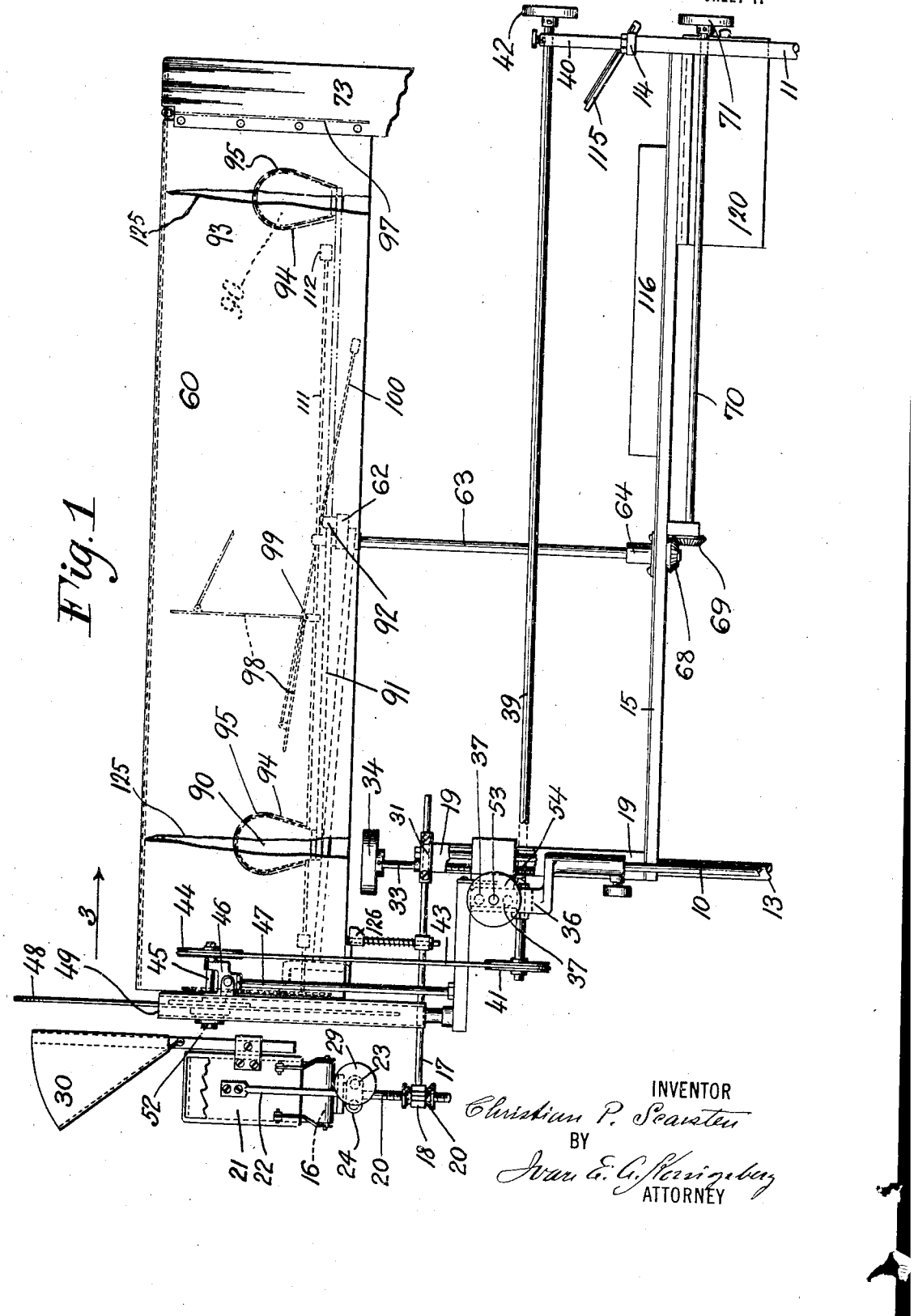

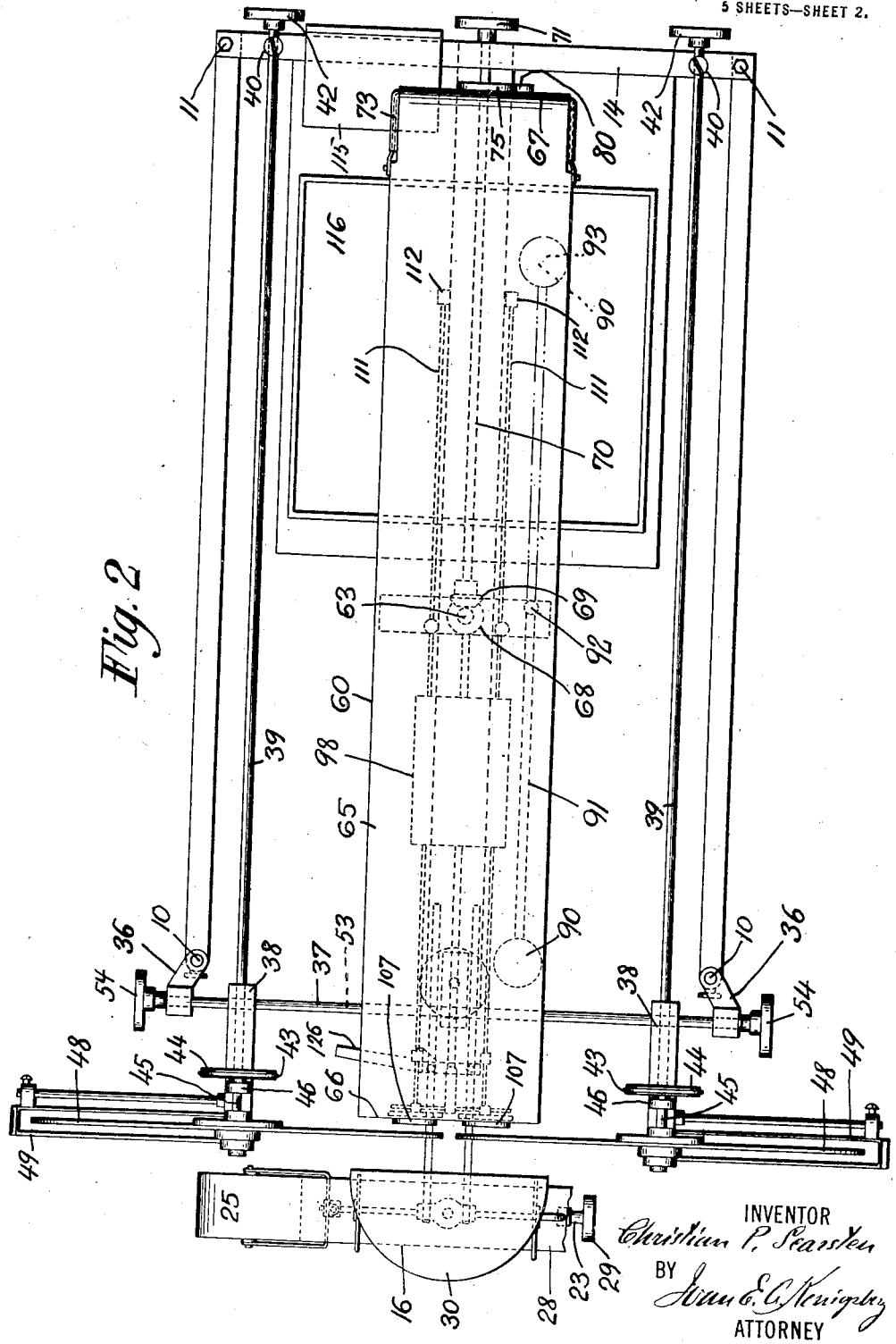

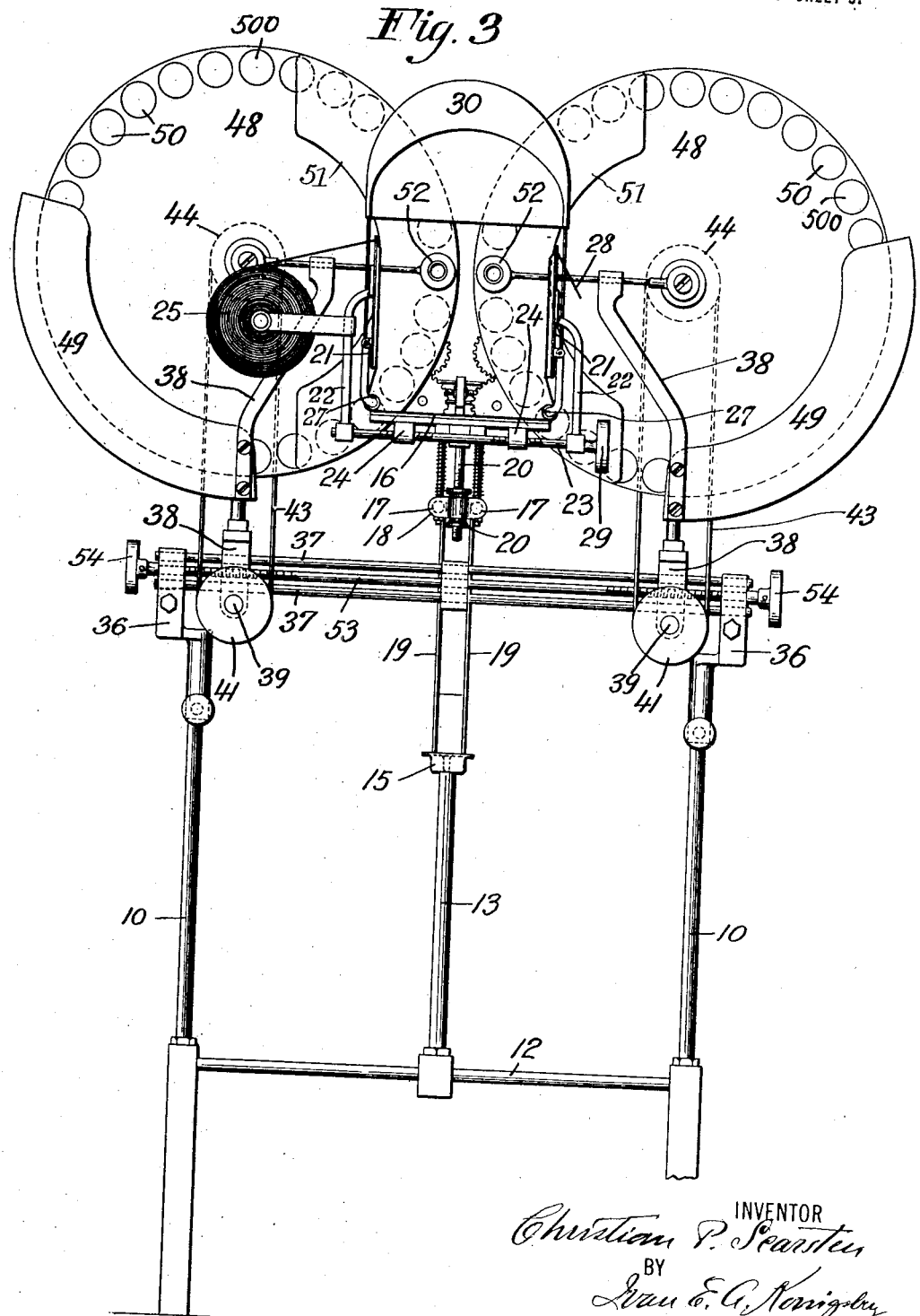

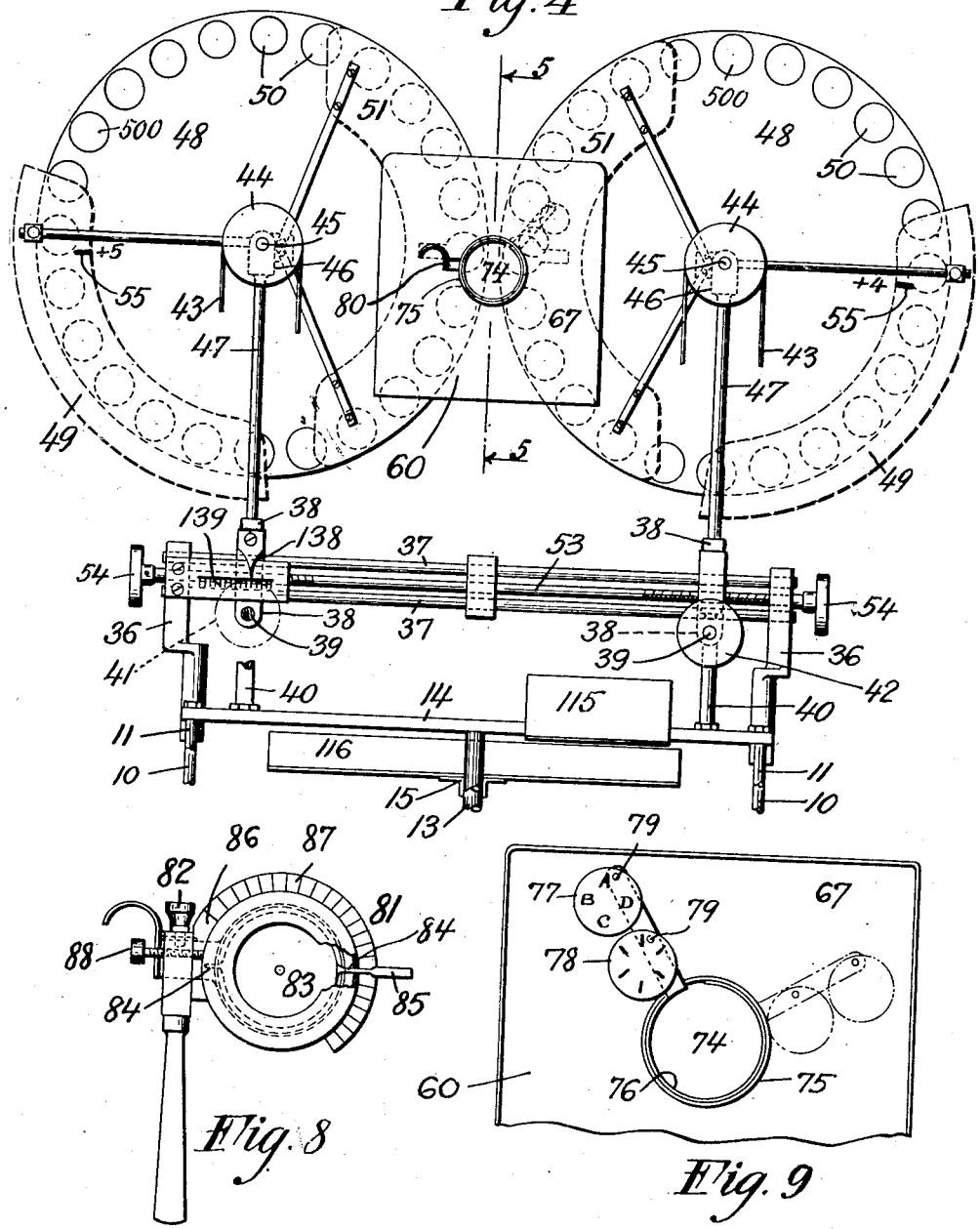

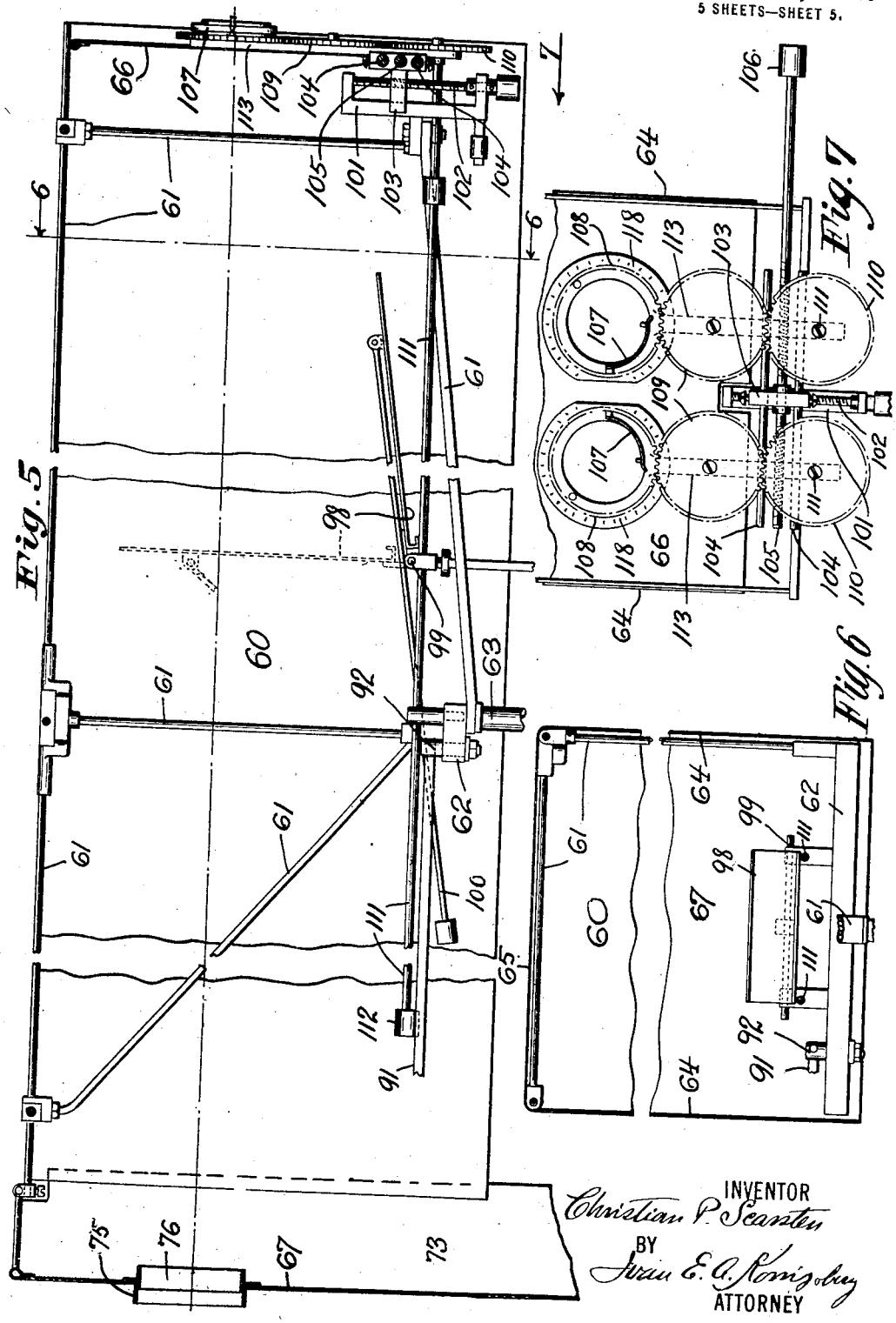

CHRISTIAN P. SCARSTEN, OF BROOKLYN, NEW YORK.

EYE-TESTING APPARATUS.

1,358,789.  Specification of Letters Patent.  Patented Nov. 16, 1920.

Application filed April 3, 1919. Serial No. 287,192.

*To all whom it may concern:*

Be it known that I, CHRISTIAN P. SCARSTEN, a citizen of the United States, and resident of Brooklyn, in the county of Kings and State of New York, have invented certain new and useful Improvements in Eye-Testing Apparatus, of which the following is a specification.

This invention relates to improvements in eye testing apparatus and the object of the invention is to provide an apparatus embodying certain novel and improved features of construction and arrangement whereby the optician and optometrist are enabled to test the eyes of their patients in a scientific manner and apply modern and up to date methods in their work by means of a thoroughly practical, simple and novel apparatus.

With the above and other objects in view the invention comprises an eye testing apparatus constructed and arranged as hereinafter set forth and as illustrated in the accompanying drawings in which—

Figure 1 is a side view of an eye testing apparatus embodying my invention with parts omitted.

Fig. 2 is a plan view of the apparatus.

Fig. 3 is a front view of the apparatus looking in the direction of the arrow 3 in Fig. 1.

Fig. 4 is an end view of the apparatus looking from the right hand end of Figs. 1 and 2.

Fig. 5 is a sectional detail view of the dark chamber taken on line 5—5 of Fig. 4.

Fig. 6 is a transverse sectional view of the dark chamber taken on line 6—6 of Fig. 5.

Fig. 7 is a detail view of the auxiliary lens frame mechanism looking in the direction of arrow 7 in Fig. 5.

Fig. 8 is a detail view of the retinoscope, and

Fig. 9 is a detail view of the astigmatic chart.

Referring to the drawings the apparatus comprises a suitable framework for supporting the several parts and which rests upon the front legs 10, 10 and the rear legs 11, 11. The front legs are joined by a transverse bar 12 which supports an upright 13, Fig. 3. The rear legs are joined by a transverse bar 14, Fig. 4, and between the said upright 13 and the bar 14 there is a central longitudinal beam 15. At the front of the apparatus there is a chin rest for the patient, who sits down during the test, and which comprises a padded chin member 16, Fig. 3, supported on rods 17, 17 in a bracket 18. The rods 17 extend from the upper ends of the vertical guide members 19 supported on the beam 15. 20, 20 indicate means of any suitable construction for adjusting the chin rest vertically as will be understood. 21, 21 indicate side pieces carried by uprights 22, 22 in threaded engagement with an adjusting screw 23 mounted in bearings 24 depending from the pad 16. One of said uprights 22 supports a paper roll 25 and the paper from the latter passes down over the one side piece, under a roll 27, over the pad 16, under another roll 27 and up over the opposite side piece. This is a sanitary feature. By pulling on the free end 28 of the paper, a fresh section of the paper is positioned on the chin rest for the patient to rest the chin on. The turning of the screw 23 by the knob 29 adjusts the width of the chin rest to suit the face of the patient and the proper height is obtained by adjustment through the means 20. A hood 30 is suitably mounted above the chin rest to shade the patient's eyes against light from above.

The aforesaid rods 17, 17 which support the bracket 18 which carries the chin rest are at their other, rear, ends joined in a bracket 31, Fig. 1, which is vertically adjustable in the guide members 19 by the screw threaded rod 33 having an operating head 34.

The front legs 10 are provided with bracket heads 36, 36 in which are supported two guide rods 37, 37 which carry supports 38, 38. In the lower portion of said supports are mounted longitudinal shafts 39, 39, one on each side. The rear ends of said shafts are supported in swiveled bearings 40, 40, on the transverse rear bar 14. Fig. 4 shows this feature on the right hand side, while the bearing on the left hand side is broken off. A pulley 41 is provided on the front end of each shaft 39 and a hand wheel is provided on the rear ends of said shafts.

A belt 43 passes over each pulley 41 and up over another pulley 44 fast on a short shaft 45 which is supported in a bearing 46 at the top of a vertical rod 47 carried on the aforesaid supports 38, one on each side of the apparatus.

Each of the shafts 45 carries a lens holder 48 and by operating the handwheels 42 the shafts 39 are rotated and by means of the pulleys 41, belts 43 and pulleys 44 the shafts 45 and hence the lens holders 48 may be rotated, that on the one side separate from that on the other side. Suitable guards 49, 49 are provided to protect the lenses 50, 50 in the lens holders and opaque shields 51, 51 are provided for preventing the patient from seeing more than one lens in the lens holders through suitable eye pieces 52, 52. The shields 51 are of course apertured to correspond with the openings in the eye pieces. These latter are also supported on the aforesaid supports 38, Fig. 3. One of the supports 38 carries a pointer 138 movable along a scale 139 to show the degree of horizontal adjustment.

53 is a right and left threaded screw shaft having its bearings in the aforesaid bracket heads 36. 54 are handwheels on said shaft which is in threaded engagement with the vertical supports 38 aforesaid. It follows then that when the shaft 53 is rotated, which may be done from either side, the said supports 38 are adjusted horizontally with respect to each other and consequently the eye pieces 52 and the lens holders 48 together with their supporting and operating parts may be adjusted to suit the distance between the patient's eyes. And of course, operation of the handwheels 42 brings the proper lenses opposite the eye pieces.

The degree or number of strength of each lens in the lens holder is marked alongside the lens together with the plus or minus sign of the lens. This is indicated in Fig. 4 which shows the rear side of the lens holders or the side facing the optometrist or optician. 55 indicates a mark on each guard 49 so placed that when for instance the plus five lens is opposite said mark, the minus five lens is in front of the eye piece and the patient's eye, so that by reading the numbers which register with the marks the optometrist or optician is able to tell instantly the number or degree of the lens through which the patient is at that time looking.

Immediately behind the lens holders there is provided a dark chamber 60, supported on a suitably built framework 61, Figs. 5 and 6, which framework is mounted on a central base 62 fixed on the upper end of a vertical shaft 63 supported in a bearing 64 on the beam 15, Fig. 1. On the said framework the dark chamber is formed by opaque cloth, fabric or other suitable material secured to the framework and having the two sides 64, 64 and a top 65. The bottom of the dark chamber is open. The front end of the chamber is closed by a wall 66 and the rear end of the chamber is closed by a wall 67. The length of the dark chamber is one meter or one diopter. The supporting shaft 63 aforesaid carries a gear 68, Fig. 1, in mesh with a gear 69 on a shaft 70 operable by a handwheel 71. When the latter is operated the entire dark chamber is rotated half a turn so as to bring the front wall 66 near the optometrist or optician. Fig. 5 shows the dark chamber rotated so as to bring the front wall 66 to the right, or the rear, and the rear wall 67 in the hood 73 to the left or the front of the apparatus.

Means are provided in the rear wall 66 for the use of a retinoscope, see Fig. 4. To this end the rear wall 67 is apertured at 74 and carries a ring 75 in which slides circumferentially a split ring 76 which carries the fixing members or disks 77 and 78 which are provided with suitable indicia or the astigmatic chart. The members 77 and 78 are pivoted at 79, 79 so that they always occupy the same position relative to their adjusted positions in the ring 75 as will be understood.

The ring 75 has a bracket 80, Fig. 4, adapted to receive the retinoscope 81 shown in Fig. 8. The retinoscope is secured to the bracket 80 by a screw 82. The usual apertured mirror 83 is pivoted at 84, 84 and may be tilted or inclined by turning the handle 85. The mirror is held rotatably in the frame 86 and may be adjusted circumferentially in said frame with relation to a scale 87 thereon. A screw 88 secures the retinoscope in adjusted position.

Inside the dark chamber there is provided a source of light as for instance an electric lamp 90 on an arm 91 pivoted at 92. The lamp may therefore be swung into two positions, one as shown in Fig. 1 to the left and another position as shown by the lamp in dot and dash line to the right. When testing the patient's eyes for far sight the lamp is placed in position as at 93 and a hood 94 is placed over the lamp. The hood has a single opening through which the light then shines into the mirror of the retinoscope. 97 is a frame for receiving a reading chart, Fig. 1, for distance reading and 98 is a frame for receiving a reading chart for near reading. The frame 98 is pivoted at 99 and may be raised or lowered by pulling or pushing on a rod 100.

Secured to the dark chamber frame 61 is a bracket 101, Fig. 5, having an adjusting screw 102. 103 is a guide member in threaded engagement with the said screw 102. The turning of the latter raises or lowers the guide member, through which pass two guide rods 104, 104 and a right and left threaded screw 105 having a knob 106. On the end wall 66 of the dark chamber there is supported two lens holders 107, 107 provided with gears 108, 108 which are operated by means of idlers 109 from gears 110, 110 fast on shafts 111, 111 supported in the bracket 62 and having handles 112, 112. By turning the latter, the lens holders 107 are rotated. The bearings for the aforesaid gears are in threaded engagement with the aforesaid right and left threaded screw 105 so that by operating the latter, the lens holders 107 are adjusted horizontally and by operating the screw 102 they are adjusted vertically.

In using the apparatus the distance between the eyes of the patient is measured and the eye pieces 52 adjusted accordingly by means of the screw shaft 53 operated by the handwheel 54 whereby the uprights 38 are moved laterally. The precise distance may be observed by means of the pointer 138 and the scale 139. Next the patient is seated in front of and facing the chin rest and the paper on the latter is renewed in the manner explained. Thereafter the eye pieces are raised or lowered by operating the handwheel 34 until they are directly in front of the patient's eyes.

Next the optometrist or optician assumes his position at the other or rear end of the apparatus. The retinoscope is placed in position in the bracket 80 and by reaching in under the dark chamber the lamp is swung into position as at 93, Fig. 1. The light rays from the lamp shines into the mirror 83 of the retinoscope from which they are reflected into the eyes of the patient. The one eye is tested separately from the other eye. To this end the lens holders 48 are each provided with an opening 500 which does not contain any lens, and an opaque space 501 diametrically opposite the opening 500. The lens holders are now so operated that an opening 500 is brought in front of the one eye, while an opaque space is brought in front of the other eye. The retinoscope is then used in the usual manner and the case diagnosed separately for each eye, the lens holders being then operated to bring approximately the correct lens in front of each eye. The proper position of the lenses and their number and strength are noted by observing their marks in registry with the mark 55 as above explained.

The hood 94 is then removed from the lamp and a reading chart placed in the frame 97. The patient is directed to read the smallest print on the chart. If not able to do so, other lenses are brought in front of the eyes by again rotating the lens holders 48 and when the proper lenses have been found, their number is noted on a card which may be placed conveniently on a small desk 115 in front of the operator, Figs. 1 and 4. Thereafter the lamp is swung around close to the patient, the frame 98 is raised, a chart placed thereon and the eyes tested for near reading and the result noted.

The one side of the dark chamber is provided with slits or openings 125 through which the lamp moves in being swung from near to far position and vice versa as will be understood. If the case requires stronger lenses than those in the holders 48, the dark chamber is swung around by operating handwheel 71 and from a tray 116 which stands conveniently within reach, other lenses are placed in the frames 107. The dark chamber is swung back to normal position and the eyes tested with the new lenses, the test being again conducted with the retinoscope or the reading charts as may be required. If it is a case of astigmatism, the cylindrical lenses which are then required, are placed in the frames 107 and their proper axial position is obtained by revolving said frames by operating the knobs 112 on the shafts 111. The axial position is noted from reading the scale 118 on the frames 107, Fig. 7.

All the results from the several tests are noted on the patient's card. When testing with the retinoscope, the fixing pointers are used to keep the patient's attention away from the light and by moving said fixing pointers around, the movements of the eyes in following them may be clearly observed.

All record cards of the patients may be conveniently stored in a small drawer 120.

The eye testing apparatus as above described will enable the optometrist or optician or other person skilled in the arts of optics and refraction to diagnose and correct errors of visual defects. The apparatus is provided with all the necessary lenses required by the optometrical profession. The distance between the operator and the patient is one diopter or one meter, thus eliminating much unnecessary calculation with respect to final results or findings which would be required were any other distance employed.

The distance of one diopter or one meter is commonly used by the optometrical profession and may be regarded as a constant. All tests made with the retinoscope or a mirror require a dark space between them and the patient or such tests cannot be made, hence the dark chamber of a length of one meter is an important feature of the apparatus. The reading or distance charts enable the operator to ascertain or prove his findings immediately after having diagnosed the case with the retinoscope. Another important advantage of the apparatus is the fact that both the charts are within the dark chamber, so that they appear brilliantly illuminated. The light will then be properly shaded by any suitable means so as not to confuse or annoy the patient.

The rotating lens holders are provided with spherical lenses both plus and minus, varying in strength from plus 0.50 up to and including plus 6.00 on one side or half of the circle, the other half contains from minus 0.50 up to and including minus 6.00. Altogether there are 12 plus spheres and 12 minus spheres in each holder, each lens increasing in strength one half diopter. And as explained additional lenses may be obtained from the tray and used in the frames 107.

The hood 73 may be lifted up and the eyes tested for reading at distances greater than one diopter if desired.

The apparatus is thus not alone provided with means for testing as described, but the operator is enabled to work quickly and conveniently because all the operations may be performed while he is sitting down. In order to prevent jar or shock the chamber 60 slides over a yielding stop 126, Fig. 1. While I have illustrated the apparatus in its preferred form, it will be understood that I do not intend limiting myself to the exact disclosure herein except as required by the scope of the appending claims.

I claim:—

1. The combination of a frame, a central upright shaft thereon, a dark chamber supported on said shaft, sight openings provided in one end of said dark chamber, means for supporting a retinoscope in the opposite end of said dark chamber, two lens holders mounted on said frame adjacent said sight openings, lenses in said lens holders, means for adjusting the lens holder vertically and horizontally, means for rotating said lens holders independently, means for rotating said upright central shaft, all of the said rotating means being operable from the one end of the said frame.

2. The combination of a frame, a dark chamber mounted thereon, said dark chamber being provided with sight openings in one end thereof, means for supporting a retinoscope in the other end of said dark chamber, supporting means for the latter, illuminating means within said dark chamber mounted on said supporting means, means at one end of said frame for rotating said dark chamber supporting means, two lens holders located adjacent said sight openings, means for adjusting said lens holder vertically, means for adjusting said lens holders horizontally, lenses in said lens holders, means for rotating said lens holders independently to aline a predetermined pair of lenses with the said sight openings and means located at the said one end of the frame for operating the said lens holders rotating means.

3. The combination of a frame, a dark chamber mounted thereon, sight openings provided in one end of said dark chamber, means at the other end thereof for observing said sight openings, two lens holders, lenses therein, means for alining a pair of said lenses with the said sight openings, guards for said lenses, registering means on said guards for positioning the said lenses, means for operating the said lens holders alining means, means for rotating said dark chamber and a yielding stop for positioning the latter in normal position.

4. The combination of a frame, a dark chamber mounted thereon, a pair of eye pieces supported in front of said chamber, circular lens holders interposed between said eye pieces and dark chamber, lenses supported circumferentially of said lens holders, means for alining a pair of lenses with the said eye pieces, shields for obscuring from view a plurality of said lenses adjacent the said pair of lenses, means for simultaneously adjusting said lens holders and eye pieces, means in said dark chamber for observing the lenses alined with said eye pieces, a chin rest in front of the latter and means for vertically adjusting the chin rest.

5. The combination of a frame, a dark chamber mounted thereon, a pair of eye pieces supported in front of said chamber, circular lens holders interposed between said eye pieces and dark chamber, lenses supported circumferentially of said lens holders, means for alining a pair of lenses with the said eye pieces, shields for obscuring from view a plurality of said lenses adjacent the said pair of lenses, means for simultaneously adjusting said lens holders and eye pieces, means in said dark chamber for observing the lenses alined with said eye pieces, means for supporting other lenses in said dark chamber, means within the latter for alining said other lenses with the said pair of alined lenses and means for rotating said dark chamber.

6. The combination of a frame, a pair of eye pieces supported at the front end of said frame, a pair of lens holders, lenses therein, means for rotating said lens holders to aline a pair of lenses with the said eye pieces, a dark chamber, an upright central shaft on said frame for supporting said dark chamber which latter is provided with sight openings in its one end, a yielding stop for positioning said dark chamber with its said sight openings in alinement with the said eye pieces, a second shaft for operating said upright shaft to rotate the said dark chamber and hand wheels located at one end of the said frame for operating the said second shaft and the said lens holders rotating means.

Signed at New York, in the county of New York and State of New York, this 1st day of April, A. D. 1919.

CHRISTIAN P. SCARSTEN.